Patented Jan. 15, 1929.

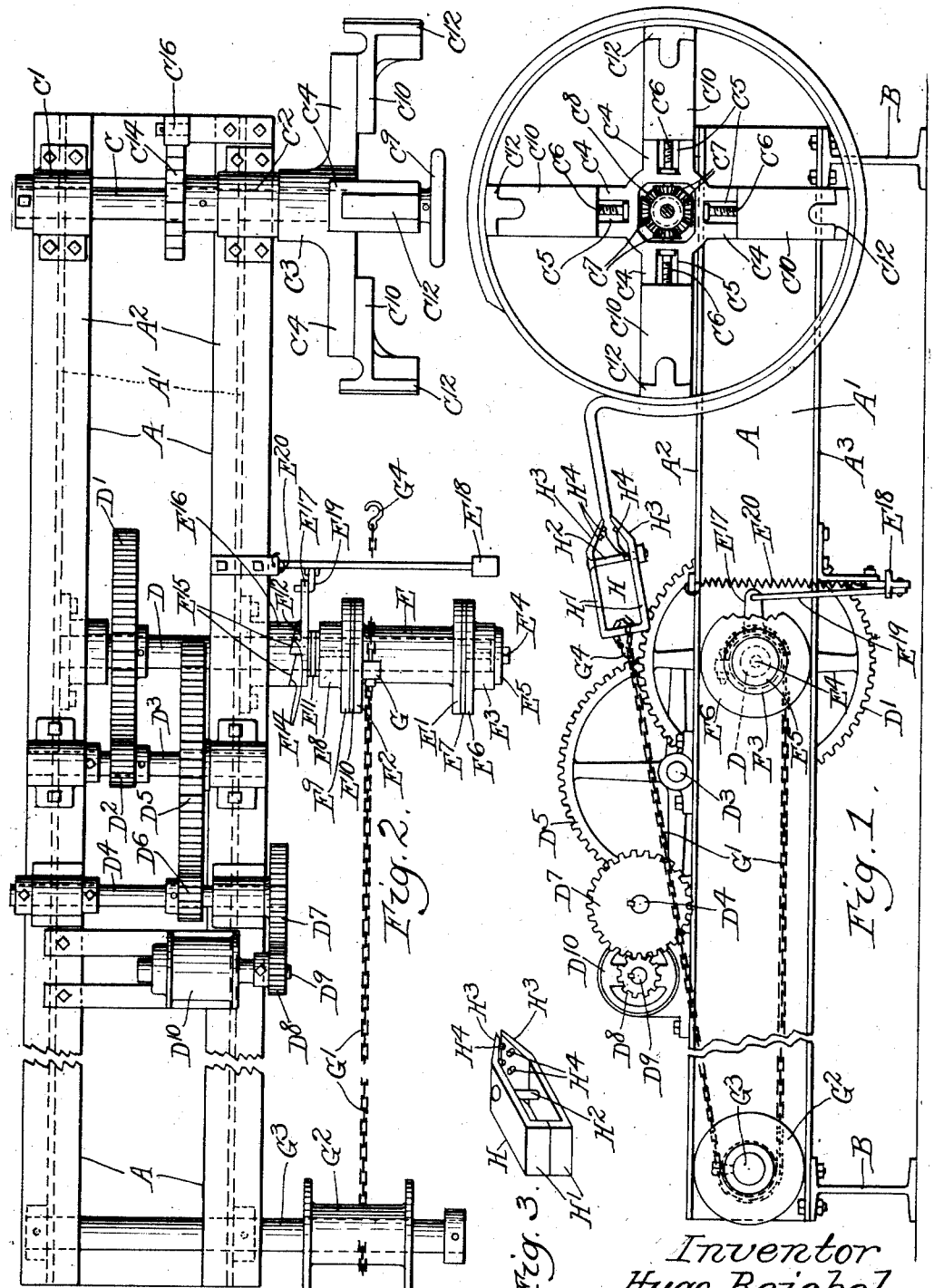

1,699,335

UNITED STATES PATENT OFFICE.

HUGO REICHEL, OF CHICAGO, ILLINOIS.

TIRE REMOVER.

Application filed February 8, 1926. Serial No. 86,767.

My invention relates to a tire remover, and particularly to a device for removing tires, for example solid tires of rubber or other materials, from the rims or wheels to which they are cemented. One object of my invention is to provide power means for rapidly effecting such separation. Another object is the provision of such a device, wherein all or substantially all of the rubber, or other material, of the tire is stripped from the rim. Other objects will appear from time to time in the course of the specification and claims.

I illustrate my invention more or less diagrammatically in the accompanying drawings, wherein—

Figure 1 is a side elevation;
Figure 2 is a plan view; and
Figure 3 is a detail.

Like parts are indicated by like symbols throughout the specification and drawings.

A A are a pair of longitudinally disposed structural members, herein shown as I-beams having the vertical web $A^1$ and the longitudinal flanges $A^2$ $A^3$ at top and bottom thereof. The members A A may be supported, and spaced apart, for example by the transverse supports B B, herein shown as short I-beam sections.

Mounted at one end of the frame is the transverse shaft C rotatably mounted in the bearings $C^1$ $C^2$. It carries at one end any suitable tire or wheel gripping or centering structure comprising, for example, the hub $C^3$ with the outwardly projecting arms $C^4$, herein shown as four in number. Such arms are centrally slotted or cut away as at $C^5$ and carry worms $C^6$ each provided at the inner end with a bevel pinion $C^7$ in mesh with a centrally bevel gear $C^8$ adapted to be rotated for example by the hand wheel $C^9$. $C^{10}$ are slides mounted upon the arms $C^4$ and adapted to be radially moved in response to rotation of the worms $C^6$. They terminate in the outwardly extended rim engaging members $C^{12}$.

The shaft C also carries a ratchet wheel $C^{14}$ adapted to be controlled by a dog $C^{16}$ mounted upon the frame.

Mounted in the frame A, intermediate its ends, is a shaft D having a gear $D^1$ in mesh with the pinion $D^2$ on an intermediate transmission shaft $D^3$ which in turn is driven from the shaft $D^4$ through the gear $D^5$ and pinion $D^6$. The shaft $D^4$, in turn, is driven through the gear $D^7$ in mesh with the pinion $D^8$ on the motor shaft $D^9$ adapted to be actuated from any suitable power source, for example by the electric motor $D^{10}$.

The shaft D carries rotatably mounted thereupon the drum E having at each end the outwardly extending flanges or rims $E^1$ $E^2$. $E^3$ is a clutch member, feathered upon the shaft D, and axially adjustable therealong for example by means of the rotation of the bolt $E^4$ controlling the holding plate $E^5$. The clutch member $E^3$ is provided with an extended member or flange $E^6$ opposed to the corresponding member $E^1$ of the drum E. Interposed between them is any suitable frictional member or washer $E^7$. $E^8$ is a second clutch member, also feathered upon the shaft D, and provided with an extended face $E^9$ opposed to the corresponding face $E^2$ of the drum. $E^{10}$ is any suitable interposed frictional member or washer. $E^{11}$ is any suitable thrust member movable along the shaft D and $E^{12}$ is a cam collar mounted about the shaft D and provided for example with the wedge or cam surfaces $E^{14}$ in opposition to similarly formed surfaces $E^{15}$ upon the fixed member $E^{16}$. $E^{17}$ is a lever controlling the cam or wedge member $E^{12}$ and is adapted to be actuated for example by means of the foot pedal $E^{18}$ to which it is connected by the link or rod $E^{19}$. $E^{20}$ is a tension spring tending to draw the pedal upwardly and thus to hold the member $E^{12}$ in withdrawn position.

It will be readily understood from the foregoing that when the foot pedal $E^{18}$ is depressed its motion will be transmitted through the link $E^{19}$ to the lever or arm $E^{17}$ of the cam collar $E^{12}$, thereby producing an arcuate movement of the latter. This arcuate movement will, through the action of the companion cam faces $E^{14}$ and $E^{15}$, cause the said cam collar to be shifted axially of the shaft D which axial movement will be transmitted through the thrust member $E^{11}$ to the clutch member $E^8$ and winding drum E. The pressing together of these members will cause the drum E to be frictionally locked to the shaft D through the friction washers $E^7$ and $E^{10}$, such members serving as friction clutches, as can be readily understood.

The drum E carries a lug G to which may be secured any suitable flexible tension member for example the chain $G^1$. The chain may pass about the sheave $G^2$ rotating about the shaft $G^3$ at the opposite end of the frame. The opposite end of the chain may terminate in the hook $G^4$.

H diagrammatically illustrates any suitable clamping member adapted to be secured to the severed end of the tire. I illustrate it herein as consisting of two members $H^1$ adapted to be connected for example by the bolt $H^2$ and provided at their forward ends with converging portions $H^3$, the inner surfaces of which may be formed with studs or points $H^4$.

It will be realized that, whereas I have illustrated a practical and operative device, nevertheless many changes in size, shape, number and disposition of parts may be made without departing from the spirit of my invention, and I wish my drawings to be taken as in a broad sense diagrammatic and illustrative rather than as limiting me to the specific mechanisms described and shown. In particular it will be realized that I do not wish to limit myself to the particular chuck shown or the particular driving connections and driving means, or the particular clutch mechanism.

The use and operation of my invention are as follows:

It is the practice to cement solid tires to the rims or wheels upon which they are carried, in contrast to the detachable securing of pneumatic tires. Normally a solid tire is not removed from a rim or wheel until it is worn out, and the purpose of its final removal is prevailingly to salvage the material of which it is composed. It is difficult to cut these tires from the rims, because the rims generally are provided with upwardly or outwardly projecting flanges, and to sever the tire from the rim leaves a relatively thick layer of good rubber, if it is a rubber tire which is being removed, which is either lost, or must be ploughed out at considerable difficulty and expense.

I have developed a mechanism for quickly, efficiently and economically stripping solid tires from rims which consists, stated simply, of providing a support for the tire or rim, and of providing means for applying a tension to the severed end of the tire, to draw it away from the rim and to strip it from the cement by which it is secured. In employing my device I first mount the rim upon any suitable holding means, for example the adjustable centering and gripping means above described and shown. With any suitable severing means I then sever the tire, to provide a relatively long thin lip of material. This lip should be cut long enough to receive a holding clamp, for example the clamp shown in Figure 3. The chain is then secured to the clamp, the outer end passing around the sheave $G^2$, the motor is actuated, and the clutch thrown in. As the drum E rotates, it draws in upon the chain, and thus exerts a tension upon the tire which tends to strip it from the rim. The rim is held against rotation, for example by the ratchet $C^{14}$, and the dog $C^{16}$. If the tire tends to stick to the cement so strongly as to resist the tension, or as to tear, the operator may pass a sharp edged instrument across the inside of the tire and this is in practice sufficient to prevent binding or sticking, the tension being such that a slight touch of a sharp edged tool is sufficient. When a considerable length of the tire has been released, I may, if necessary, remove the holding clamp and loop the chain about the loose end of the tire. The tension upon the chain draws the chain noose thus formed tight and is sufficient to hold the chain against any substantial longitudinal movement along the tire end. From time to time it becomes necessary to shift the rim, which can be done manually, if desired, it being turned preferably clockwise, as shown in Figure 1, the dog thus overrunning the ratchet. I may also adjust the chain along the tire from time to time, as the separation progresses. Preferably, during the pulling, the point of separation between tire and rim is above the center of rotation of the chuck, as shown in Figure 1.

The operator maintains constant control of the tension through the foot lever $E^{18}$ which serves to thrust the clutch member $E^8$ against the drum E and thus the drum E against the clutch member $E^3$. The drum is thereby gripped between two clutch members both of which rotate with the shaft, and I have illustrated an anti-friction member or washer between each clutch member and the drum. Any relaxation of pressure upon the foot pedal permits the pedal to rise in response to the tension of the spring $E^{20}$, and tension upon the chain immediately ceases.

I claim:

1. In a device for removing tires from rims to which they are attached, a rim supporting member, means for applying tension to the tire and for drawing an end of the tire away from said rim along a generally radial path, comprising a drive shaft, a drum member rotatably mounted thereupon, a flexible tension member secured to the drum member, means for securing the opposite end of the flexible tension member to the tire, a clutch member feathered on the shaft and adapted to be opposed to the drum member, a cam surface on said clutch member, a rotatable cam member mounted about said shaft and opposed to said clutch cam surface and means for rotating it to thrust said clutch longitudinally along said shaft against said drum.

2. In a device for removing tires from rims to which they are attached, a rim-supporting member; a winding drum; means for rotating said drum; means for gripping a portion of the tire after the latter has been severed; and a flexible tension member adapted to be wound upon said drum, one end of said tension member being readily detachably secured to said gripping means, whereby said gripping means may be removed and the end of said tension member directly secured to said tire.

3. In a device for removing tires from rims to which they are attached, a rim-supporting member; a winding drum; means for rotating said drum; means for gripping a portion of the tire after the latter has been severed; and a flexible tension member having one end secured to said drum, whereby it may be wound thereon, the other end of said tension member being provided with a hook for readily detachably securing said end to said gripping means, whereby said gripping means may be removed and said end looped around and directly secured to said tire.

Signed at Chicago, county of Cook and State of Illinois, this 1st day of February, 1926.

HUGO REICHEL.